Feb. 18, 1958  F. E. ALTMAN ET AL  2,823,583
OPTICAL OBJECTIVE LENS COMPRISING TWO CEMENTED
MENISCUS TRIPLETS ENCLOSED BY TWO
OUTER COLLECTIVE LENSES
Filed April 4, 1956

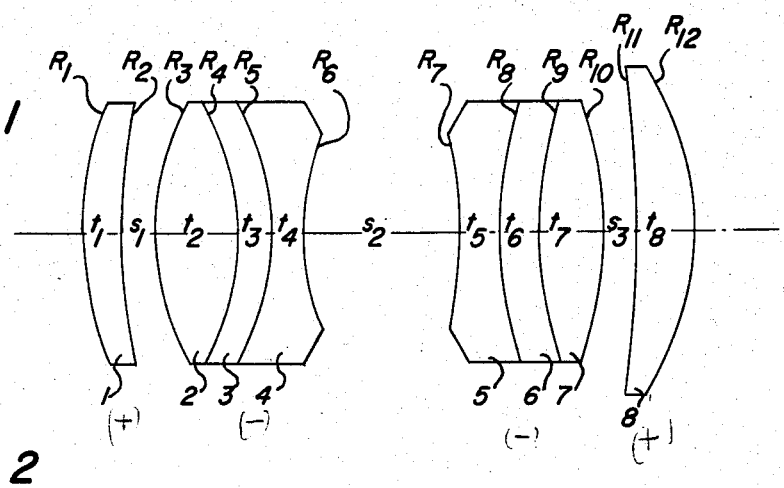

Fig. 1

Fig. 2

| EF = 100mm | | | | |
|---|---|---|---|---|
| LENS | N | V | RADII | THICKNESSES |
| 1 | 1.517 | 64.5 | $R_1 = +36.02$ | $t_1 = 3.1$ mm |
|   |       |      | $R_2 = +418.3$ | $s_1 = 0.7$ |
| 2 | 1.611 | 58.8 | $R_3 = +24.59$ | $t_2 = 7.4$ |
| 3 | 1.523 | 58.6 | $R_4 = -45.33$ | $t_3 = 3.5$ |
| 4 | 1.617 | 36.6 | $R_5 = -44.52$ | $t_4 = 4.3$ |
|   |       |      | $R_6 = +13.42$ | $s_2 = 13.8$ |
| 5 | 1.617 | 36.6 | $R_7 = -13.42$ | $t_5 = 4.3$ |
| 6 | 1.523 | 58.6 | $R_8 = +44.52$ | $t_6 = 3.5$ |
| 7 | 1.611 | 58.8 | $R_9 = +45.33$ | $t_7 = 7.4$ |
|   |       |      | $R_{10} = -24.59$ | $s_3 = 0.7$ |
| 8 | 1.720 | 29.3 | $R_{11} = -74.42$ | $t_8 = 3.1$ |
|   |       |      | $R_{12} = -32.20$ | |

FRED. E. ALTMAN
RUDOLF KINGSLAKE
INVENTORS

BY Daniel I. Mayne,
Harold F. Bennett
ATTORNEY & AGENT

United States Patent Office 2,823,583
Patented Feb. 18, 1958

2,823,583

OPTICAL OBJECTIVE LENS COMPRISING TWO CEMENTED MENISCUS TRIPLETS ENCLOSED BY TWO OUTER COLLECTIVE LENSES

Fred E. Altman and Rudolf Kingslake, Rochester, N. Y., assignors to Eastman Kodak Company, Rochester, N. Y., a corporation of New Jersey Application April 4, 1956, Serial No. 576,073

3 Claims. (Cl. 88—57)

This invention relates to optical objectives of the type comprising two negative meniscus compound components concave toward each other and axially aligned between two positive members. This is known as a Gauss type or, in a more recent classification (see J. O. S. A., May 1946, pp. 251-255) an M-type lens.

The object of the invention is to provide a lens of this type in which the zonal spherical aberration and the spherochromatism are very highly corrected so that as a process lens it gives critical definition over a moderate field and as an erector or relay lens in a telescope system it permits the observer's eye to move about at the eyepoint without causing the image to shift or flutter as it does in the presence of even a small amount of spherical aberration.

In a typical lens of the above-defined type the two positive members are simple lens elements. However, it is well known to split either or both positive members into two positive elements or to make up either or both positive members as a cemented or airspaced combination of positive and negative elements. The present invention is directed to the structure of the compound negative components and is useful with any of the known arrangements of positive members.

According to the present invention a lens of the above defined type is made up in which each negative meniscus component is a cemented triplet consisting of a weak meniscus element whose refractive index is between 1.43 and 1.60 cemented between a biconcave element and a biconvex element both of whose refractive indices are at least 0.08 above that of the weak meniscus element. These two refractive indices may range as high as any used in the negative components of known lenses of the above described type, which is to about 1.75. Theoretically the thickness of the weak meniscus element can be varied during design to control the zonal spherical aberration, an increase of its thickness tending toward overcorrection of the zonal spherical aberration relative to the marginal. From a practical point of view, however, we prefer to vary the thickness only between limits which are convenient to manufacture, for example between 0.02 $f$ and 0.10 $f$ where $f$ is the focal length of the objective, and to vary the radii of curvature of the two cemented surfaces also. We also choose glasses for the biconcave and biconvex elements enclosing the meniscus element such that the dispersive indices are close enough together to require the cemented surfaces to have radii of curvature between 0.2 $f$ and $f$ and to be convex toward the central airspace of the objective to give correction of longitudinal color. Furthermore, we find it convenient to choose as the low index glass for the meniscus element a glass which has approximately the same dispersive index V as that of the biconvex element. This gives the designer a chromatically ineffective surface which can be varied without affecting the color appreciably.

Starting with these preliminary values, we correct the marginal spherical aberration mainly by varying the concave surfaces bounding the central airspace (which surfaces also strongly affect the Petzval sum) and by varying the shape of the positive members, we correct the longitudinal color mainly by varying the cemented surface bounding the biconcave element, and we correct the zonal spherical aberration by varying the other cemented surface and concurrently varying the shape of the positive members to restore the marginal correction. Varying this second cemented surface (counting from the central space) changes the marginal spherical aberration much more rapidly than the zonal, both of them being changed in the direction of undercorrection when the surface is strengthened. Then when the marginal aberration is restored by varying the shape of the postive member or a component thereof the marginal and zonal aberrations are changed at a more nearly equal rate. Hence it will be seen that the net effect is to change the zonal spherical aberration in the direction of overcorrection.

We find that the objects of the invention are usually gained while keeping the difference in curvature between the two cemented surfaces in each negative triplet numerically smaller than 0.4 $f$.

In symmetrical or nearly symmetrical objectives designed for use at low magnifications it is usual to vary both negative triplets at once, and in lenses for use at unit magnification it is convenient to start with collimated rays in the central airspace and work in both directions.

The curvature of field, as usual, is controlled mostly by varying the central airspace, and the lateral aberrations, coma, distortion, and lateral color are controlled in the usual way by varying one half of the objective with respect to the other half.

Thus, to summarize, the two cemented surfaces of each negative triplet are convex toward the central airspace and their radii of curvature are between 0.2 $f$ and $f$ and the reciprocals thereof differ by less than 0.4 $f$.

We have discovered that the above-described structure according to the invention also has a very beneficial effect upon the sphero-chromatism of the objective. This effect can be controlled somewhat by the choice of dispersive index in the low-index meniscus element but from a practical point of view it is most convenient to choose a dispersive index close to that of one of the elements cemented thereto, namely the biconvex element, so as to have one chromatically ineffective surface as above described.

The radii of curvature of the outer surfaces of the negative components may range from 0.1 $f$ to 0.6 $f$ for the concave surfaces and from 0.2 $f$ to 0.7 $f$ for the convex surfaces, about the same range as in the known prior art. It is known to lens designers that these radii tend to be greater in higher aperture objectives and that they are also affected by other factors such as refractive indices, the structure of the positive members and the requirements for Petzval curvature.

The thickness of each negative triplet is preferably between 0.1 $f$ and 0.25 $f$.

Although the invention does not reside in the positive members which enclose the negative components, it is preferred that each of these members have a dioptric power between 0.5 P and 2.0 P and that the sum of their dioptric powers be between 1.5 P and 3.5 P where P is the dioptric power of the whole objective. Also their thicknesses should not exceed a limit which would make the overall length greater than $f$, and the outermost surface in each case is preferably convex. The refractive indices of all elements in the positive members are between 1.43 and 1.88, as in the prior art.

In the case in which each positive member is a single positive element, it is preferred that the outermost surface in each case be convex with a radius of curvature between 0.25 f and 1.9 f.

There are other known ways of controlling the zonal spherical aberration, but all of them involve increasing the overall length of the lens. We were faced with a need for a lens with this aberration highly corrected and with an overall length not to exceed a specified limit of about 0.55 f. By means of the invention we were able to produce a lens of approximately f/3.8 aperture and under the specified maximum length which has less than .0005 f zonal spherical aberration. The invention is equally useful when the limit on the overall length is, for example, 0.75 f.

In the accompanying drawing:

Fig. 1 shows in diagrammatic axial section a lens according to the invention designed for use as an erector in a sighting telescope and Fig. 2 gives constructional data for one specific example of the same.

This data is as follows:

[E. F.=100 mm.]

| Lens | N | V | Radii, mm. | Thicknesses, mm. |
|---|---|---|---|---|
| 1 | 1.517 | 64.5 | $R_1=+36.02$ | $t_1=3.1$ |
|   |       |      | $R_2=+418.3$ | $S_1=0.7$ |
| 2 | 1.611 | 58.8 | $R_3=+24.59$ | $t_2=7.4$ |
|   |       |      | $R_4=-45.33$ |           |
| 3 | 1.523 | 58.6 | $R_5=-44.52$ | $t_3=3.5$ |
| 4 | 1.617 | 36.6 | $R_6=+13.42$ | $t_4=4.3$ |
|   |       |      |              | $S_2=13.8$ |
| 5 | 1.617 | 36.6 | $R_7=-13.42$ | $t_5=4.3$ |
|   |       |      | $R_8=+44.52$ |           |
| 6 | 1.523 | 58.6 | $R_9=+45.33$ | $t_6=3.5$ |
| 7 | 1.611 | 58.8 | $R_{10}=-24.59$ | $t_7=7.4$ |
|   |       |      |                 | $S_3=0.7$ |
| 8 | 1.720 | 29.3 | $R_{11}=-74.42$ | $t_8=3.1$ |
|   |       |      | $R_{12}=-32.20$ |           |

In this table as in the drawings the lens elements are numbered in order from the front to the rear in the first column, and the corresponding refractive indices N for the D line of the spectrum and the conventional dispersive indices V are given in the second and third columns. The radii of curvature R of the optical surfaces, the thicknesses t of the lens elements and the axial separations S, each numbered by subscripts in order from front to rear, are given in the last two columns. This relay lens or erector was designed for use with collimated light in the central airspace $S_2$ and with each half operating at a relative aperture of f/7.6, that is the whole lens is nominally an f/3.8. Although not limited to any particular environment of use, the particular example shown above was designed for use in a sighting telescope in combination with a more or less conventional objective and eyepiece having the following characteristics:

[Objective (not shown)    EF=106.6 mm.]

| Lens | N | V | Radii, mm. | Thicknesses, mm. |
|---|---|---|---|---|
| 1 | 1.512 | 60.5 | $R_1=+108.1$ | $t_1=2.4$ |
| 2 | 1.672 | 32.2 | $R_2=-113.7$ | $t_2=2.8$ |
|   |       |      | $R_3=-699.5$ | $S_1=111.0$ |
| 3 | 1.517 | 64.5 | $R_4=+51.69$ | $t_3=3.5$ |
| 4 | 1.672 | 32.2 | $R_5=-51.69$ | $t_4=2.8$ |
|   |       |      | $R_6=-219.6$ |           |

The aperture stop is 41.2 mm. in front of the vertex of the front surface of the objective, and it is imaged substantially in the central space of the erector. A prism system totalling 92.8 mm. in axial thickness of LBC glass (N=1.5725, V=57.4) and a reticle plate 4.2 mm. thick are assumed to be mounted between objective and erector.

[Eyepiece (not shown)    EF=13.34 mm.]

| Lens | N | V | Radii, mm. | Thicknesses, mm. |
|---|---|---|---|---|
| 1 | 1.672 | 32.2 | $R_1=-16.43$ | $t_1=1.43$ |
|   |       |      | $R_2=+26.20$ |            |
| 2 | 1.523 | 58.6 | $R_3=-14.79$ | $t_2=6.30$ |
|   |       |      |              | $S_1=0.08$ |
| 3 | 1.611 | 58.8 | $R_4=+45.19$ | $t_3=3.15$ |
|   |       |      | $R_5=-45.19$ |            |
|   |       |      |              | $S_2=0.08$ |
| 4 | 1.611 | 58.8 | $R_6=+14.52$ | $t_4=7.17$ |
| 5 | 1.672 | 32.2 | $R_7=-22.41$ | $t_5=1.43$ |
|   |       |      | $R_8=+19.47$ |            |

In the design of the system the lateral color was well corrected at all zones by the following method. The eyepiece was allowed to have a rather large residual of undercorrected lateral color, which was matched by opposite lateral color in the rest of the system. We introduced this lateral color in the erector rather than in the objective because a color-free image was required at the reticle. Furthermore, the conditions of use required the presence of the prisms, already mentioned, between the objective and the erector. If these prisms could have been behind the erector they would have helped to balance the lateral color of the eyepiece, but being in front of the erector they made it worse so that, to balance the lateral color of the eyepiece plus that of the prisms, it was necessary to make the rear element 6 of the erector of extremely high dispersion dense flint glass and the front element 1 of extremely low dispersion crown. As the lateral color of an eyepiece is changed during design the shape of its lateral color aberration curve changes rapidly whereas the lateral color of the erector is roughly proportional to field angle and can be changed without changing the shape of its curve very much. Accordingly, we found that when the undercorrected eyepiece is matched by the rest of the system both curves have about the same shape, and thus the lateral color of the system is almost perfectly corrected at all zones. However, this chromatic dissymmetry in the erector necessitated unequal refractive indices in the two positive members and caused serious zonal spherical aberration, spherochromatism and coma, but by means of the invention as above described we achieved excellent correction for all these errors and also maintained complete symmetry of the negative meniscus triplets, a decided advantage in a fire control instrument where replacement parts have to be considered.

It is readily seen from the table in the drawing that the example embodies all the features of novelty of the invention and all the preferred features of prior art co-operating therewith. The weak meniscus elements in which the novelty chiefly resides are elements 3 and 6 (Fig. 1) Both of these elements have radii of curvature 0.445 f and 0.453 f for the convex and concave surfaces respectively, thus all these radii are betwen 0.2 f and f as specified. The curvatures (being the reciprocals of the radii) differ by 0.04/f, which is less than 0.4/F according to the invention. The thickness of each negative triplet is 0.152 f and this as well as the concave surfaces $R_6$ and $R_7$ and the convex surfaces $R_3$ and $R_{10}$ of the negative triplets are within the preferred range.

Each of the positive members 1 and 8 has a dioptric power equal to +1.31 P, which is within the preferred range from 0.5 P to 2.0 P. They both are of the more usual variety consisting of one positive element each, and as preferred when embodying the invention in lenses of this variety, the radii of curvature $R_1$ and $R_{12}$ of the outermost surfaces are within the preferred range from 0.25 $f$ to 1.9 $f$.

By means of these features we have obtained an extremely high degree of correction of the spherical abberation in three colors, as shown in the following table:

| $f$-Number | C, mm. | D, mm. | F, mm. |
|---|---|---|---|
| 7.6 | +.287 | +.019 | +.237 |
| 10.9 | +.311 | +.054 | +.201 |
| ∞ | +.228 | .000 | +.140 |

In this table the first column gives the $f$-number for a marginal ray, a zonal ray and a paraxial ray. This is the $f$-number for each half of the lens working with collimated light in the central space, that is for the whole lens working at unit magnification. The second, third and fourth columns give the spherical aberration for the whole lens for rays of C, D and F wavelengths, respectively. These are measured from the D paraxial image point and are computed for rays originating at the D paraxial object point.

It will be noted that the zonal aberration, defined in the customary way as

Zonal aberration =

$$\left\{\frac{\text{marginal } f-\text{number}}{\text{zonal } f-\text{number}}\right\}^2 \times \text{marginal aberration}$$

is equal to only 0.045 mm. or 0.00045 $f$ for the D wavelength and is roughly the same for the other wavelengths.

The lateral color at 2° is −0.045 mm. to match the eye-piece for the reason described above.

This example has been given on a scale of 100 mm. focal length for the erector to conform to custom. In practice the telescope system was made up in about three times this scale.

As an example of the method varying the thicknesses $t_3$ and $t_6$ of the weak meniscus elements within limits and concurrently varying the radius of curvature of the chromatically ineffective surfaces $R_4$ and $R_9$ the following synopsis is given of several trial examples computed during the design of this lens. Starting with parallel light in the central space $S_2$, paraxial, marginal and zonal rays were computed through one half of the erector lens. The two radii $R_7$ and $R_8$ were maintained constant while a series of values of $R_9$ were tried with $t_6$=2.77 mm. and another series with $t_6$=3.46 mm. In each case the marginal aberration was reduced to about 0.03 mm. or less by bending the rear element 8 and the zonal aberration then computed by the above formula. The results are as follows:

| Trial No. | $t_6$ | Deviation | Zonal Aberration |
|---|---|---|---|
| 2 | 2.77 | −14′40″ | −0.32 |
| 3 | 2.77 | −9′01″ | −0.16 |
| 4 | 2.77 | −4′39″ | −0.12 |
| 5 | 2.77 | −1′12″ | −0.06 |
| 6 | 3.46 | −0′14″ | +0.08 |
| 7 | 3.46 | −8′15″ | −0.21 |
| 8 | 3.46 | −3′10″ | −0.04 |

In this table the radius of curvature $R_9$ is not given directly but is indicated by the "deviation" which is specifically the net deviation of the marginal ray by the two cemented surfaces. It was found that this net deviation should be small, less than ±10′ in the examples computed, to give zonal correction. In the final design, a small residual of zonal aberration in one half is balanced by an opposite residual in the other half of the erector lens.

We claim:

1. An optical objective consisting of two collective members and axially aligned therebetween two negative meniscus components concave toward a central airspace, in which the power of each positive member is between 0.5/$f$ and 2/$f$ where $f$ is the focal length of the objective as a whole, in which the concave surface of each negative component has a radius of curvature between 0.1/$f$ and 0.6/$f$ and the convex surface thereof has a radius of curvature between 0.2/$f$ and 0.7/$f$, and in which the thickness of each negative meniscus component is between 0.1/$f$ and 0.25/$f$ and the over all length of the objective is less than $f$, characterized by each negative meniscus component being a cemented triplet consisting of a weak meniscus element cemented between a biconcave element and a biconvex element, by the refractive index $N_m$ of each meniscus element being between 1.43 and 1.60, by the refractive index of each of the two elements which enclose the meniscus element in each triplet being between $(N_m+0.08)$ and 1.75, and by the radii of curvature of the cemented surfaces of each said triplet being between 0.2/$f$ and $f$ and the reciprocals thereof differing numerically by less than 0.4/$f$.

2. An optical objective according to claim 1 in which each positive member consists of a single positive element whose outermost surface is convex and has a radius of curvature between 0.25/$f$ and 1.9/$f$.

3. An optical objective constructed substantially according to the specifications set forth in the following table:

| Lens | N | V | Radii | Thicknesses |
|---|---|---|---|---|
| 1 | 1.52 | 64 | $R_1$=+0.4$f$ | $t_1$=0.03$f$ |
|  |  |  | $R_2$=+4$f$ | $S_1$=0.01$f$ |
| 2 | 1.61 | 59 | $R_3$=+0.25$f$ | $t_2$=0.07$f$ |
| 3 | 1.52 | 59 | $R_4$=−0.45$f$ | $t_3$=0.04$f$ |
| 4 | 1.62 | 37 | $R_5$=−0.44$f$ | $t_4$=0.04$f$ |
|  |  |  | $R_6$=+0.13$f$ | $S_2$=0.14$f$ |
| 5 | 1.62 | 37 | $R_7$=−0.13$f$ | $t_5$=0.04$f$ |
|  |  |  | $R_8$=+0.44$f$ |  |
| 6 | 1.52 | 59 | $R_9$=+0.45$f$ | $t_6$=0.04$f$ |
| 7 | 1.61 | 59 | $R_{10}$=−0.25$f$ | $t_7$=0.07$f$ |
|  |  |  |  | $S_3$=0.01$f$ |
| 8 | 1.72 | 29 | $R_{11}$=−0.7$f$ | $t_8$=0.03$f$ |
|  |  |  | $R_{12}$=−0.3$f$ |  | where the lens elements are numbered from front to rear in the first column, the refractive index N for the D line of the spectrum and the dispersive index V of each lens element are given in the second and third columns, and the radii of curvature R of the optical surfaces, the thicknesses to of the lens elements and the axial separations S between components, each numbered by subscripts from front to rear, are given in the last two columns, and in which the + and − values of radii denote surfaces respectively convex and concave to the front and $f$ is the equivalent focal length of the objective as a whole.

References Cited in the file of this patent

UNITED STATES PATENTS

| | | |
|---|---|---|
| 535,897 | Goerz et al. | Mar. 19, 1895 |
| 547,207 | Goerz et al. | Oct. 1, 1895 |
| 671,066 | Graf | Apr. 2, 1901 |
| 1,779,257 | Lee | Oct. 21, 1930 |
| 2,130,760 | Warmisham | Sept. 20, 1938 |
| 2,398,276 | Altman | Apr. 9, 1946 |
| 2,401,324 | Altman | June 4, 1946 |
| 2,441,036 | Schade | May 4, 1948 |
| 2,481,639 | Altman et al. | Sept. 13, 1949 |
| 2,541,014 | Orser | Feb. 13, 1951 |